C. T. BUSH.
Carriage-Spring.

No. 53,568. Patented Apr. 3, 1866.

Witnesses:
James H. Beall
B. A. M. Froiseth

Inventor:
Clark T. Bush

UNITED STATES PATENT OFFICE.

CLARK T. BUSH, OF RENSSELAERVILLE, NEW YORK.

IMPROVEMENT IN CARRIAGES.

Specification forming part of Letters Patent No. 53,568, dated April 3, 1866.

*To all whom it may concern:*

Be it known that I, CLARK T. BUSH, of the town of Rensselaerville, county of Albany, and State of New York, have invented a new and useful Improvement in Carriages; and I do hereby declare the following to be a full, clear, and exact description of the same, reference being had to the accompanying drawings, making a part of this specification, in which—

Figure 1:
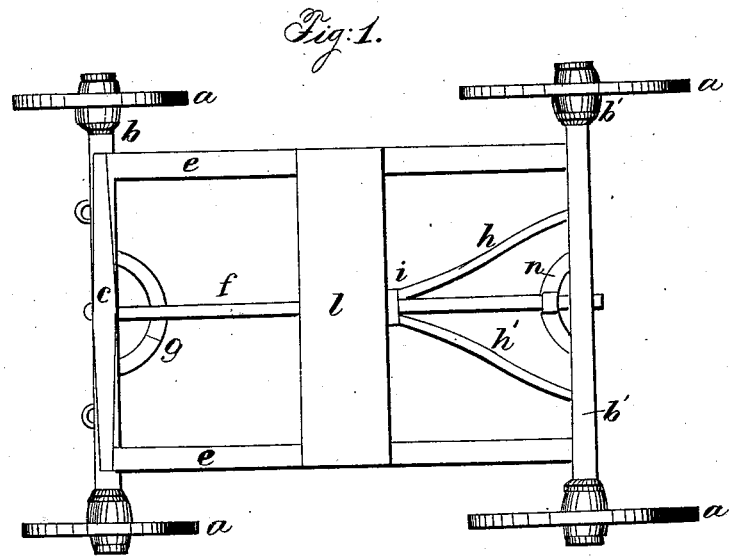
Figure 3:
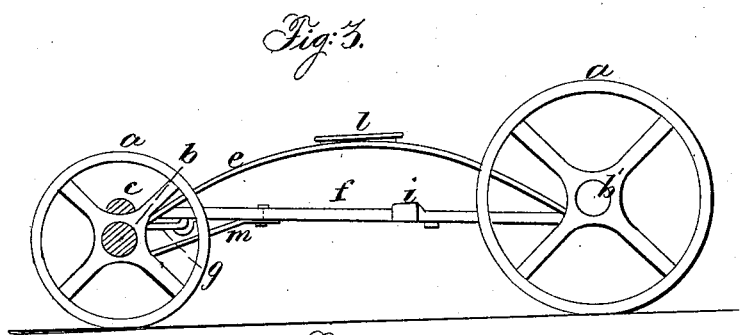
Figure 2:
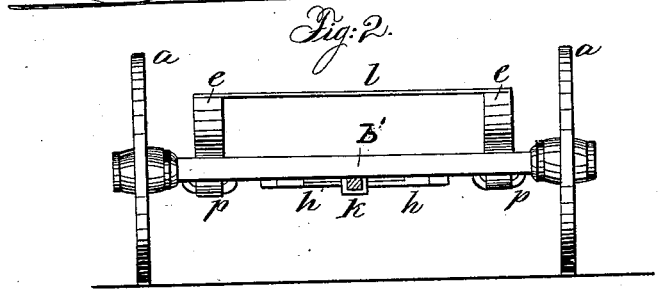

Figure 1 is a plan of my invention, showing the carriage with the body for carrying the passengers removed. Fig. 2 is a rear view of the same, and Fig. 3 is a side elevation thereof.

Similar letters of reference indicate corresponding parts in the several figures.

The nature and object of my invention is to so arrange the connecting parts of a side-spring carriage or wagon as to comprise all the benefits of side springs and at the same time preserve the vertical position of the axles, and also to allow such expansion and contraction between the forward and rear axles that the carriage may pass over ordinary obstructions with very little jolting and very slight strain upon the connecting parts.

To enable others skilled in the art to make and use my invention, I will proceed to describe its construction and operation.

$a\ a$ are the wheels upon which the carriage runs. $b$ is the fore axle, and $b'$ is the rear axle. $c$ is the forward bolster, to which are attached the forward ends of the side springs, $e\ e$. $f$ is the perch, connecting the bolster with the rear axle. $g$ is the circle or fifth-wheel. $h$ and $h'$ are diagonal braces extending from the rear axle to the sliding loop $i'$, through which the perch $f$ freely slides. Another similar loop, $k$, is firmly attached to the under side of the rear axle, through which the perch also freely slides, as shown in Fig. 2.

$l$ is a board, fastened transversely from one spring to the other, upon which the body of the carriage is supported.

$m$ is a diagonal brace extending forward and downward from the perch. The forward end of this brace takes the king-bolt in the usual manner.

The forward ends of the springs $e\ e$ may be attached by the springs $p\ p$ to the bolster, either on its under or upper side, and their rear ends may be attached in the same manner to the under or upper side of the rear axle. The best manner of attaching these side springs is as follows: Each end of the under and longer leaf of the side spring should be turned over, so as to form a hinge sufficiently large to receive a bolt strong enough to sustain the spring and the weight which it is required to bear. These bolts should be sustained in dead-eyes fastened rigidly, the one pair to the front bolster, the other to the rear axle, thereby supporting the spring by a hinge-connection at each end, said hinge having a bearing equal in length to the width of the spring. Such a hinge-connection prevents the vibratory motion given to the axle when the springs are rigidly attached to it, and also prevents much of the strain and wear which otherwise take place.

Carriages as now constructed, with side springs, require the interposition of a rigid perch extending from the bolster to the hind axle, firmly mortised and braced, in order to prevent the twisting or turning over the axle by the action of the springs and the weight carried thereon in passing over a rough road.

It is plain that when carriages are constructed with side springs in the ordinary manner, with rigid perch, the action of the springs when passing over obstructions, being in a measure vertical, is restricted by the perch, which holds the axles always the same distance apart.

By reference to the drawings it will be seen that carriages constructed on my plan, the perch $f$ being free to slide in the loops $i$ and $k$, when the fore wheels encounter an obstruction the perch $f$ slides in its loops $i\ k$, and thus the horizontal distance between axles is diminished and the full elasticity of the spring is obtained. When the rear wheels strike an obstruction the horizontal distance between the axles is increased and the same result is obtained. The diagonal braces $h$ and $h'$, being rigidly fastened to the rear axle at the rear ends and to the loop $i'$ at their front ends, serve to maintain the axle in its vertical position.

$n$ is a plate fastened to the under side of the rear axle, and is bent up in form over the perch, and acts as a spring in the perch to prevent its rattling. The rear end of the perch is provided with a stop, to prevent it from sliding clear out of the loop $k$ in case of accidental breaking of the springs.

By extending or lengthening the loop $i$ along the perch $f$, so as to obtain a sufficient bearing, the perch might be shortened at the rear end, and dispense with the loop $k$ and plate $n$.

What I claim as my invention, and desire to secure by Letters Patent, is—

The arrangement and combination of the side springs, $e\ e$, yielding perch $f$, diagonal braces $h\ h'$, slot or loop $i$, and hinges $p\ p$, substantially as and for the purposes set forth.

CLARK T. BUSH.

Witnesses:
B. A. M. FROISETH,
JAMES W. BEALL.